(12) United States Patent
Hsiang (10) Patent No.: US 10,819,981 B2
(45) Date of Patent: Oct. 27, 2020

(54) METHOD AND APPARATUS FOR ENTROPY CODING OF SOURCE SAMPLES WITH LARGE ALPHABET

(71) Applicant: MEDIATEK INC., Hsin-Chu (TW)

(72) Inventor: Shih-Ta Hsiang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 44 days.

(21) Appl. No.: 16/018,489

(22) Filed: Jun. 26, 2018

(65) Prior Publication Data

US 2018/0302626 A1    Oct. 18, 2018

Related U.S. Application Data

(62) Division of application No. 15/542,732, filed as application No. PCT/CN2016/072666 on Jan. 29, 2016, now Pat. No. 10,057,580.

(Continued)

(51) Int. Cl.
*H04N 19/13* (2014.01)
*H04N 19/139* (2014.01)
(Continued)

(52) U.S. Cl.
CPC ........... *H04N 19/13* (2014.11); *H04N 19/139* (2014.11); *H04N 19/1887* (2014.11);
(Continued)

(58) Field of Classification Search
CPC ...... H04N 19/13; H04N 19/139; H04N 19/70; H04N 19/1887; H04N 19/91
See application file for complete search history.

(56) References Cited

U.S. PATENT DOCUMENTS 7,791,510 B2    9/2010   Maeda et al.
8,891,622 B2    11/2014  Miyoshi et al.
(Continued)

FOREIGN PATENT DOCUMENTS

CN    101420231 A    4/2009
CN    102905125 A    1/2013
(Continued)

OTHER PUBLICATIONS

International Search Report dated Apr. 20, 2016, issued in application No. PCT/CN2016/072666.
(Continued)

*Primary Examiner* — Neil R Mikeska
(74) *Attorney, Agent, or Firm* — McClure, Qualey & Rodack, LLP (57) ABSTRACT

A method of entropy coding for source symbols in an encoder receives a current source symbol having a current symbol value belonging to a set of symbol values. When the source symbols correspond to horizontal components or vertical components of motion vector differences (MVDs) for Inter prediction coding, the method determines a threshold for the set of symbol values. If an absolute current symbol value is greater than the threshold associated with a corresponding motion vector resolution for the current source symbol, the method derives a first binary string. If the absolute current symbol value is not greater than the threshold associated with the corresponding motion vector resolution for the current source symbol, the method derives a second binary string. Finally, the method encodes the first binary string or the second binary string depending on whether the absolute current symbol value is greater than the threshold.

6 Claims, 3 Drawing Sheets

Related U.S. Application Data (60) Provisional application No. 62/237,279, filed on Oct. 5, 2015, provisional application No. 62/109,853, filed on Jan. 30, 2015.

(51) Int. Cl.
*H04N 19/70* (2014.01)
*H04N 19/91* (2014.01)
*H04N 19/169* (2014.01)
H04N 19/184 (2014.01)
H04N 19/52 (2014.01)

(52) U.S. Cl.
CPC ............ *H04N 19/70* (2014.11); *H04N 19/91* (2014.11); *H04N 19/184* (2014.11); *H04N 19/52* (2014.11)

(56) References Cited

U.S. PATENT DOCUMENTS

| | | | |
|---|---|---|---|
| 9,668,001 | B2 | 5/2017 | Seregin et al. |
| 2011/0019737 | A1 | 1/2011 | Yang et al. |
| 2013/0039426 | A1* | 2/2013 | Helle ............... H04N 19/52 375/240.16 |
| 2013/0114693 | A1 | 5/2013 | Gao |
| 2013/0236097 | A1 | 9/2013 | Liu et al. |
| 2013/0272389 | A1 | 10/2013 | Sze et al. |
| 2013/0301944 | A1 | 11/2013 | Kim et al. |
| 2014/0140400 | A1* | 5/2014 | George ............. H04N 19/513 375/240.12 |
| 2014/0210652 | A1* | 7/2014 | Bartnik ............... H03M 7/40 341/67 |
| 2014/0334539 | A1 | 11/2014 | Kim |
| 2017/0238001 | A1* | 8/2017 | Li .................. H04N 19/436 375/240.12 |

FOREIGN PATENT DOCUMENTS

| | | |
|---|---|---|
| CN | 103326731 A | 9/2013 |
| CN | 103782597 A | 5/2014 |

OTHER PUBLICATIONS

Hsiang, S.T., et al.; "CE10 Results of Test 6 on unified method for entropy coding intra string copy syntax elements;" Joint Collaborative Team on Video Coding (JCT-VC) of ITU-T SG 16 WP 3 and ISO/IEC JTC 1/SC 29/WG 11; 19th Meeting: Strasbourg, FR; Oct. 2014; pp. 1-19.

Hsiang, S.T., et al.; "Non-SCCE4: Unified method for coding string matching syntax using a universal entropy coding scheme;" Joint Collaborative Team on Video Coding (JCT-VC) of ITU-T SG 16 WP 3 and ISO/IEC JTC 1/SC 29/WG 11; 18th Meeting: Sapporo, JP; Jun. 2014; pp. 1-7.

Hsiang, S.T., et al.; "CE3-related: Improved method for entropy coding offset vectors of 2-D matching;" Joint Collaborative Team on Video Coding (JCT-VC) of ITU-T SG 16 WP 3 and ISO/IEC JTC 1/SC 29/WG 11; 20th Meeting: Geneva, CH; Feb. 2015; pp. 1-6.

Hsiang, S.T., et al.; "CE2-related: Improved method for entropy coding MVD/BVD;" Joint Collaborative Team on Video Coding (JCT-VC) of ITU-T SG 16 WP 3 and ISO/IEC JTC 1/SC 29/WG 11; 20th Meeting: Geneva, CH; Feb. 2015; pp. 1-4.

* cited by examiner

METHOD AND APPARATUS FOR ENTROPY CODING OF SOURCE SAMPLES WITH LARGE ALPHABET

CROSS REFERENCE TO RELATED APPLICATIONS

The present invention is a Divisional of pending U.S. application Ser. No. 15/542,732, filed on Jul. 11, 2017, which is a National Phase of PCT/CN2016/072666, filed on Jan. 29, 2016, which claims priority to U.S. Provisional Patent Application, Ser. No. 62/109,853, filed on Jan. 30, 2015 and U.S. Provisional Patent Application, Ser. No. 62/237,279, filed on Oct. 5, 2015. The U.S. Provisional Patent Applications are hereby incorporated by reference in their entireties.

FIELD OF THE INVENTION

The present invention relates to entropy coding. In particular, the present invention relates to coding techniques for reducing complexity associated with entropy coding for sources with large alphabet.

BACKGROUND AND RELATED ART

Figure 1:
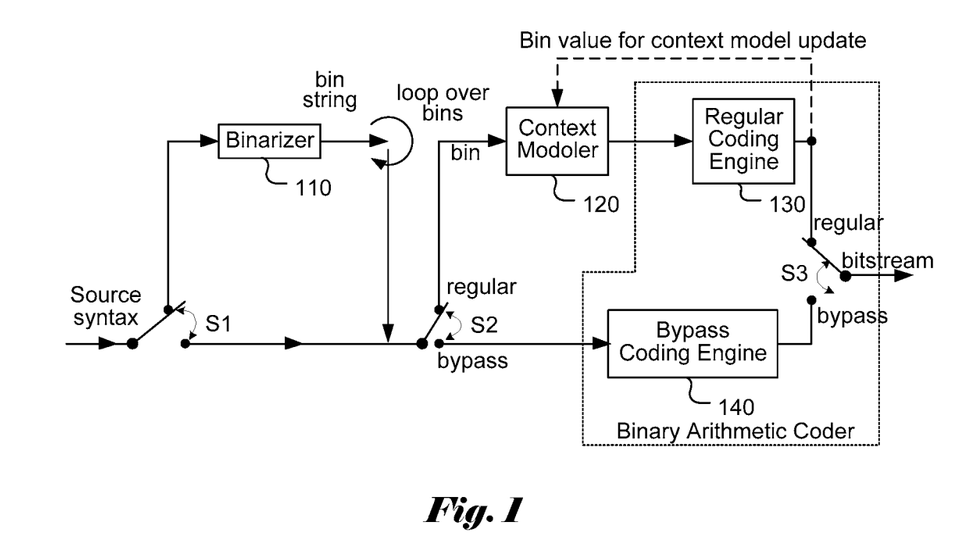
FIG. 1 illustrates an exemplary block diagram of the CABAC process, which consists of a path for regular CABAC mode and a bypass mode.

Context-based adaptive binary arithmetic coding (CABAC) is a high efficiency entropy coding tool that has been widely used in advanced video coding such as H.264 and HEVC (High Efficiency Video Coding). For example, various syntax elements of the HEVC standard are coded in the CABAC mode, where entropy coding is applied to the binarized syntax elements adaptively based on context associated with an underlying syntax element. FIG. 1 illustrates an exemplary block diagram of the CABAC process. Since the arithmetic coder in the CABAC engine can only encode the binary symbol values, the CABAC process needs to convert the values of the syntax elements into a binary string using a binarizer (110). The conversion process is commonly referred to as binarization. During the coding process, the probability models are gradually built up from the coded symbols for the different contexts. The context modeler (120) serves the modelling purpose. During normal context based coding, the regular coding engine (130) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (140) may be used. As shown in FIG. 1, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts, as shown in FIG. 1

Figure 2:
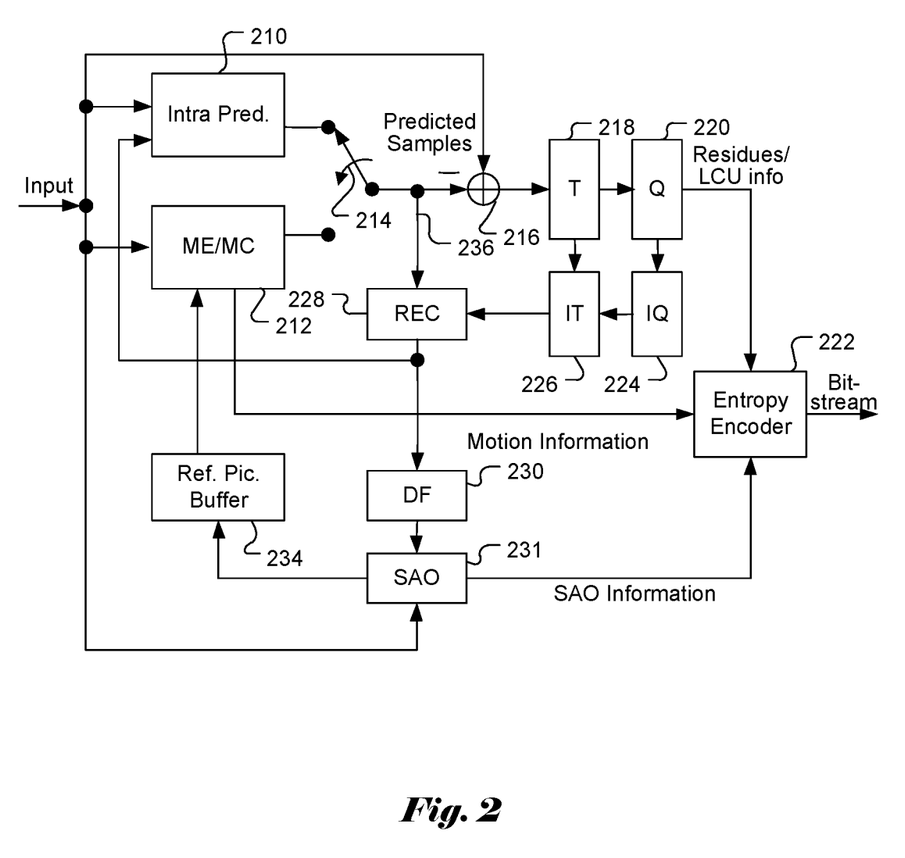
FIG. 2 illustrates an exemplary adaptive Inter/Intra video coding system incorporating in-loop processing according to HEVC.

As mentioned above, CABAC is a form of entropy coding. CABAC can be applied to source symbols to reduce the required data for representing the source symbols. When CABAC is applied to a video coding system, the source symbols may correspond to the prediction residuals, motion information, coding parameters, etc. For example, CABAC is used in HEVC, where the standard is based on the conventional hybrid coding approach. According to HEVC, a picture is divided into multiple non-overlapped largest coding units (LCUs), also called coding tree blocks (CTBs). The pixel values of a coding unit (CU) are predicted spatially or temporally. The resulting residual signal is transformed for further redundancy removal. The transform coefficients are then quantized and entropy coded. The reconstructed picture is recovered from the decoded residual signal and the prediction signal. After reconstruction, the reconstructed picture is further processed by in-loop filtering to reduce coding artifacts. FIG. 2 illustrates an exemplary system block diagram for a HEVC-based encoder.

FIG. 2 illustrates an exemplary adaptive Inter/Intra video coding system incorporating in-loop processing according to HEVC. For inter-prediction, Motion Estimation (ME)/Motion Compensation (MC) 212 is used to provide prediction data based on video data from other picture or pictures. Switch 214 selects Intra Prediction 210 or inter-prediction data and the selected prediction data is supplied to Adder 216 to form prediction errors, also called residues. The prediction error is then processed by Transform (T) 218 followed by Quantization (Q) 220. The transformed and quantized residues are then coded by Entropy Encoder 222 to form a video bitstream corresponding to the compressed video data. The bitstream associated with the residues is then packed with side information such as motion, mode, and other information associated with the image area. The side information may also be subject to entropy coding to reduce required bandwidth. Accordingly, the data associated with the side information are provided to Entropy Encoder 222 as shown in FIG. 2. In the Intra mode, a reconstructed block may be used to form Intra prediction of spatial neighboring block. Therefore, a reconstructed block from REC 228 may be provided to Intra Prediction 210. When an inter-prediction mode is used, a reference picture or pictures have to be reconstructed at the encoder end as well. Consequently, the transformed and quantized residues are processed by Inverse Quantization (IQ) 224 and Inverse Transform (IT) 226 to recover the residues. The residues are then added back to prediction data 236 at Reconstruction (REC) 228 to reconstruct video data. The reconstructed video data can be stored in Reference Picture Buffer 234 and used for prediction of other frames.

As shown in FIG. 2, incoming video data undergoes a series of processing in the encoding system. The reconstructed video data from REC 228 may be subject to various impairments due to a series of processing. Accordingly, various in-loop processing is applied to the reconstructed video data before the reconstructed video data are stored in the Reference Picture Buffer 234 in order to improve video quality. In the High Efficiency Video Coding (HEVC) standard, deblocking (DF) processing module 230, Sample Adaptive Offset (SAO) processing module 231 have been developed to enhance picture quality. The in-loop filter information may have to be incorporated in the bitstream so that a decoder can properly recover the required information. Therefore, in-loop filter information from SAO is provided to Entropy Encoder 222 for incorporation into the bitstream. In FIG. 2, DF 230 is applied to the reconstructed video first and SAO 231 is then applied to DF-processed video (i.e., deblocked video).

The JCT standardization body is currently in the process of developing the HEVC screen content coding (SCC) extension. In contrast to the conventional natural video with a continuous color tone, the screen content video often contain a few pilot colors and sharp edges and boundaries. Several new tools such as Intra block copy (IBC), palette coding, Intra line copy and Intra string copy (ISC) are currently under investigation for potential adoption into the future the HEVC SCC extension. Again, CABAC can be applied to residuals or coding information associated with these new tools. The details of IBC and palette coding can be found in JCTVC-S1005 (Joshi, et al., *High Efficiency Video Coding (HEVC) Screen Content Coding: Draft 2*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1005). The details of Intra line copy and Intra string copy (ISC) can be found in JCTVC-S1103 (Chen, et al., *Description of Core Experiment 3 (CE3): Intra Line Copy and Intra String Copy*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1103).

BRIEF SUMMARY OF THE INVENTION

A general entropy coding method for source symbols with a large alphabet size is disclosed. This method determines a prefix part and any suffix part for the current symbol. In order to reduce the complexity, the method divides the prefix part into at least two parts by comparing a test value related to the prefix against a threshold. If the test value related to prefix part is greater than or equal to a threshold, the method derives a first binary string by binarizing a first prefix part related to the prefix part using a first variable length code. If the test value related to the prefix part is less than the threshold, the method derives a second binary string by binarizing a second prefix part related to the MSB index using a second variable length code or a first fixed-length code. The method further derives a third binary string by binarizing a suffix part of the current symbol using a second fixed-length code or a first truncated binary code if any suffix part exists. The method then encodes at least one of the first binary string and the second binary string using a CABAC (context-adaptive binary arithmetic coding) mode.

The prefix part may be derived by applying a Rice or k-th order Exp-Golomb (EGk) binarization process to the current symbol. The prefix part may also correspond to a MSB (most significant bit) index of a current symbol value of the current symbol. The suffix part corresponds to one or more refinement bits of the current symbol value if any suffix part exists, where the current symbol value belongs to a set of symbol values.

The first method mentioned above may signal a syntax flag to indicate whether the MSB index plus one is greater than zero. If the MSB index plus one is greater than zero, another syntax flag can be signaled to indicate whether the MSB index plus one is greater than or equal to a threshold. The first prefix part may correspond to the MSB index plus one minus the threshold, and the second prefix part may correspond to the MSB index or the threshold minus 1 and minus a syntax element value representing the MSB index plus one.

For source symbols having signed values, the first method can represent the signed values by a sign part and an absolute value part. The first method is then applied to the absolute value part. The first method may also be applied to source symbols corresponding to vectors by applying the first method to each component of the vector. A corresponding method for the decoder side is also disclosed.

Another method addresses entropy coding for horizontal components or vertical components of motion vector differences (MVDs) in Inter prediction coding. If the absolute current symbol value is greater than a threshold associated with a corresponding motion vector resolution for the current source symbol, a first binary string is derived by binarizing a remaining absolute level of the absolute current symbol value using a variable length code. If the absolute current symbol value is not greater than the threshold, a second binary string is derived by binarizing the remaining absolute level of the absolute current symbol value using a fixed-length code. The first binary string or the second binary string is encoded depending on whether the absolute current symbol value is greater than the threshold. A corresponding method for the decoder side is also disclosed.

Another method is disclosed, which explores the correlation between two components of motion vector difference (MVD) for Inter prediction coding, or block vector difference (BVD) for Intra block copy (IBC), Intra line copy or Intra string copy (ISC) coding. A first flag is determined to indicate whether a first absolute value of a first component is greater than zero. The first component corresponds to one of the horizontal component and the vertical component. A second flag is determined to indicate whether a second absolute value of a second component is greater than zero. The second component corresponds to the other of the horizontal component and the vertical component. The second flag is encoded using context model derived based on the first flag after the first flag is coded, or a pair of the first flag and the second flag is encoded jointly. A corresponding method for the decoder side is also disclosed.

Yet another method is disclosed, which explores the redundancy associated with coding two components of offset vector for Intra line copy or Intra string copy (ISC) coding. One or more first syntax elements indicating whether a first absolute value corresponding to the horizontal component is greater than zero and whether a second absolute value corresponding to the vertical component is greater than zero are signaled. One or more second syntax elements representing a sign part of the horizontal component and a second sign flag representing the sign part of the vertical component and the sign part of the horizontal component are signaled only if said one or more first syntax elements indicate the first absolute value being greater than zero and the second absolute value being greater than zero. A corresponding method for the decoder side is also disclosed.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention addresses various aspect of entropy coding to reduce the complexity, improve compression efficiency or both.

In one aspect, the present invention discloses a universal entropy coding method for source symbols with large alphabet size, such as syntax elements generated in a video coding system. In the PCT Patent Application, Serial No. PCT/CN2015/081751, filed on Jun. 18, 2015, a universal efficient entropy coding is disclosed, where an unsigned source sample value is represented in a binary form by signaling the most significant bit (MSB) followed by the refinement bits. The MSB index for the sample value equal to 0 is assigned to −1. The prefix part of the resulting codeword represents the MSB index plus 1, denoted by msb_idx_p1. The prefix part msb_idx_p1 of a unsigned syntax x is given by $$\text{msb\_idx\_p1} = \begin{cases} \text{Floor}(\text{Log2}(x)) + 1, & \text{if } x > 0; \\ 0, & \text{otherwise.} \end{cases} \quad (1)$$

The suffix part, denoted by refinement_bits, represents the value derived from the refinement bits and is present if msb_idx_p1>1. The decoded syntax value x is given by $$x = \begin{cases} (1 << (\text{msb\_idx\_p1} - 1)) + \text{refinement\_bits}, & \text{if msb\_id\_plus1} > 1; \\ 0, & \text{otherwise.} \end{cases} \quad (2)$$

For a signed source sample, the method mentioned above is applied to encode the absolute value of the source sample together with the coded sign bit.

For binarization of the prefix part, a unary tree structure is often used, which generates the bin string by repeating N "1"s followed by a "0" to indicate an integer N. The generated binary string is the well-known unary code. The suffix part is often binarized using fixed-length codes. When the maximum sample value is known, the truncated unary code and the truncated binary code can be used for binarization of the prefix part and the suffix part, respectively. Table 1 illustrates an example of the syntax table for signaling an unsigned syntax value using the method mentioned above. The syntax msb_idx_p1 is signaled first as indicated by Note (1-1). If msb_idx_p1 is greater than 1, syntax refinement_bits is signaled as indicated by Note (1-2). Different context modeling schemes can be employed for different syntax types specified by the input parameter syntaxType.

TABLE 1

| | Note |
|---|---|
| unsigned_val_msb_index_coding( syntaxType) { | |
|   msb_idx_p1 | (1-1) |
|   if(msb_idx_p1 > 1 ) | |
|     refinement_bits | (1-2) |
| } | |

The resulting bin strings can be coded by context adaptive binary arithmetic coding (CABAC). The prefix part can be coded in the CABAC mode with a more sophisticated context modeling scheme. The refinement bits and sign bits can be coded using a relatively simple context modeling scheme or the bypass mode. For example, the CABAC mode can be used for coding the bins corresponding to the most significant bit index and the bypass mode can be used for coding all other bins.

The universal entropy coding according to PCT patent Application PCT/CN2015/081751 can achieve good balance between compression efficiency and system complexity. However, when the source has a large alphabet size with a non-decreasing probability distribution of sample values, the prefix part may lead to long codewords. Therefore, the first method of the present invention utilizes a different codeword structure to further divide the alphabet space into two or more parts. An example incorporating an embodiment of the first method is illustrated in Table 2. The syntax flag msb_idx_p1_grT_flag is first signaled, as indicated by Note (2-1) to identify whether msb_idx_p1 is less than a threshold msb_idx_thre. If the flag is equal to 1 (i.e., MSB index plus 1 greater than or equal to the threshold msb_idx_thre), then the syntax msb_idx_p1_minus_thre representing msb_idx_p1 minus the threshold msb_idx_thre as indicated by Note (2-2) is signaled. In this case, msb_idx_p1 is reconstructed by adding msb_idx_p1_minus_thre and msb_idx_thre as indicated by Note (2-4). Otherwise, the syntax value itself (i.e., msb_idx_p1) is signaled as indicated by Note (2-3). The threshold msb_idx_thre can be a predetermined value or a variable signaled in the SPS (Sequence Parameter Set), PPS (Picture Parameter Set), or slice header. Such codeword structure can be efficient for entropy coding the prefix values of the source samples with high probability close to msb_idx_thre.

In the above example, msb_idx_p1, instead of the prefix part itself, is tested against the threshold to determine which way to code the prefix part. Accordingly, msb_idx_p1 is referred as a "test value related to the prefix part". However, other test values may also be used to practice the present invention. For example, instead of comparing "msb_idx_p1" against threshold "msb_idx_thre", an equivalent test can be performed by comparing "msb_idx" against threshold "msb_idx_thre−1".

TABLE 2

| | Note |
|---|---|
| unsigned_val_msb_index_coding( syntaxType) { | |
|   msb_idx_p1_grT_flag | (2-1) |
|   if ( msb_idx_p1_grT_flag == 0 ) | |
|     msb_idx_p1 | (2-3) |
|   else { | |
|     msb_idx_p1_minus_thre | (2-2) |
|     msb_idx_p1 = msb_idx_p1_minus_thre + msb_idx_thre | (2-4) |
|   } | |
|   if( msb_idx_p1 > 1 ) | |
|     refinement_bits | |
| } | |

In another embodiment for the first method, the flag msb_idx_p1_gr0_flag is first coded to identify whether syntax msb_idx_p1 is greater than 0. If the flag is equal to 1, then the syntax value msb_idx_p1 minus 1 is coded using the codeword structure with the alphabet space divided into two or more parts as mentioned above. An example based on the first method, which utilizes the flag msb_idx_p1_gr0_flag, is illustrated in Table 3. In another example, when the syntax msb_idx_p1 is less than the threshold msb_idx_thre, syntax msb_idx_p1 is represented by coding (msb_idx_thre−1−msb_idx_p1), instead of msb_idx_p1 itself, as illustrated in Table 4.

As shown in Table 3, syntax msb_idx_p1_gr0_flag is signaled first as indicated by Note (3-1). If syntax msb_idx_p1_gr0_flag is equal to 0, it means that msb_idx_p1 is equal to 0 as indicated by Note (3-2). If syntax msb_idx_p1_gr0_flag is not equal to 0, syntax msb_idx_p1_grT_flag is signaled as indicated by Note (3-3). If syntax msb_idx_p1_grT_flag is equal to 0, syntax msb_idx is signaled in Note (3-4) and msb_idx_p1 is reconstructed as indicated by Note (3-5). If syntax msb_idx_p1_grT_flag is not equal to 0, then the syntax representing msb_idx_p1minus the threshold (i.e., msb_idx_p1_minus_thre) is signaled as indicated by Note (3-6). In this case, msb_idx_p1 is reconstructed by adding msb_idx_p1_minus_thre and msb_idx_thre as indicated by Note (3-7).

TABLE 3

|  | Note |
|---|---|
| unsigned_val_msb_index_coding( syntaxType) { |  |
|     msb_idx_p1_gr0_flag | (3-1) |
|     if ( msb_idx_p1_gr0_flag = = 0 ) |  |
|         msb_idx_p1 = 0 | (3-2) |
|     else { |  |
|         msb_idx_p1_grT_flag | (3-3) |
|         if ( msb_idx_p1_grT_flag = = 0 ) { |  |
|             msb_idx | (3-4) |
|             msb_idx_p1 = msb_idx + 1 | (3-5) |
|         } else { |  |
|             msb_idx_p1_minus_thre | (3-6) |
|             msb_idx_p1 = msb_idx_p1_minus_thre + msb_idx_thre | (3-7) |
|         } |  |
|     } |  |
|     if( msb_idx_p1 > 1 ) |  |
|         refinement_bits |  |
| } |  |

The syntax structure in Table 4 is similar to that in Table 3. However, if syntax msb_idx_p1_grT_flag is equal to 0, syntax representing threshold minus MSB index (i.e., thre _minus_msb_idx) is signaled in Note (4-1) and msb_idx_p1 is reconstructed as indicated by Note (4-2). If syntax msb_idx_p1_grT_flag is not equal to 0, then the syntax representing msb_idx_p1 minus the threshold (i.e., msb_idx_p1_minus_thre) is signaled as indicated by Note (4-3). In this case, msb_idx_p1 is reconstructed according to Note (4-4).

TABLE 4

|  | Note |
|---|---|
| unsigned_val_msb_index_coding( syntaxType) { |  |
|     msb_idx_p1_gr0_flag |  |
|     if ( msb_idx_p1_gr0_flag = = 0 ) |  |
|         msb_idx_p1 = 0 |  |
|     else { |  |
|         msb_idx_p1_grT_flag |  |
|         if ( msb_idx_p1_grT_flag = = 0 ) { |  |
|             thre _minus_msb_idx | (4-1) |
|             msb_idx_p1 = msb_idx_thre − 1 − thre_minus_msb_idx | (4-2) |
|         } else { |  |
|             msb_idx_p1_minus_thre | (4-3) |
|             msb_idx_p1 = msb_idx_p1_minus_thre + msb_idx_thre | (4-4) |
|         } |  |
|     } |  |
|     if( msb_idx_p1 > 1 ) |  |
|         refinement_bits |  |
| } |  |

In the above discussion, a specific binarization example is used to illustrate embodiments of the present invention. However, the universal entropy coding for sources with a large alphabet size is also applicable to other binarization cases. For example, the binary representation of the source symbol may be derived by applying the Rice or the k-th order Exp-Golomb (EGk) binarization process to the current symbol.

The above embodiment can be applied to encode a syntax related to a vector representation such as motion vector difference (MVD) and block vector difference (BVD). The codeword structure shown above is then applied to each vector component. The syntax according to an embodiment of the first method can support grouping the bypass bins from the two components together. In this way, the combined bypass bins can be coded jointly for improving bitstream parsing throughput rate. An example of the syntax table for signaling syntax related to vector using the first method is illustrated in Table 5.

The syntax table in Table 5 is considered as applying the syntax table in Table 4 to two components of a vector separately. The syntax lines from Note (5-1) through Note (5-2) and from Note (5-5) through Note (5-6) are associated with the first vector component (i.e., the x-direction). The syntax lines from Note (5-3) through Note (5-4) and from Note (5-7) through Note (5-8) are associated with the second vector component (i.e., the y-direction).

TABLE 5

|  | Note |
|---|---|
| signed_vector_msb_index_coding( syntaxType) { |  |
|     abs_msb_idx_p1_gr0_flag[0] | (5-1) |
|     if ( abs_msb_idx_p1_gr0_flag[0] = = 0 ) |  |
|         abs_msb_idx_p1[0] = 0 |  |
|     else { |  |
|         abs_msb_idx_p1_grT_flag[0] |  |
|         if ( abs_msb_idx_p1_grT_flag[0] = = 0 ) { |  |
|             thre_minus_abs_msb_idx[0] |  |
|             abs_msb_idx_p1[0] = abs_msb_idx_thre[0] − 1 − thre_minus_abs_msb_idx[0] |  |
|         } else { |  |
|             abs_msb_idx_p1_minus_thre[0] |  |
|             abs_msb_idx_p1[0] = abs_msb_idx_p1_minus_thre[0] + abs_msb_idx_thre[0] |  |
|         } |  |
|     } | (5-2) |
|     abs_msb_idx_p1_gr0_flag[1] | (5-3) |
|     if ( abs_msb_idx_p1_gr0_flag[1] = = 0 ) |  |
|         abs_msb_idx_p1[1] = 0 |  |
|     else { |  |
|         abs_msb_idx_p1_grT_flag[1] |  |
|         if (abs_msb_idx_p1_grT_flag[1] = = 0 ) { |  |

TABLE 5-continued

| | Note |
|---|---|
| ``` 
            thre_minus_abs_msb_idx[1]
          abs_msb_idx_p1[1] = abs_msb_idx_thre[1] − 1 − thre_minus_abs_msb_idx[1]
      } else {
            abs_msb_idx_p1_minus_thre[1]
          abs_msb_idx_p1[1] = abs_msb_idx_p1_minus_thre[1] + abs_msb_idx_thre[1]
      }
  }
  if(abs_msb_idx_p1 [0] > 0 ) {
      if(abs_msb_idx_p1 [0 ] > 1)
            abs_refinement_bits [0]
          sign_flag [ 0]
  }
  if( abs_msb_idx_p1 [1] > 0 ) {
      if( abs_msb_idx_p1 [1 ] > 1 )
            abs_refinement_bits [1]
          sign_flag [ 1]
  }
}
``` | (5-4)<br>(5-5)<br><br><br><br><br>(5-6)<br>(5-7)<br><br><br><br>(5-8) |

The syntax elements for representing the prefix part related to a value greater than or equal to msb_idx_thre, such as msb_idx_p1_minus_thre and abs_msb_idx_p1_minus_thre, can be binarized using a unary code or truncated unary code. The syntax elements related to the prefix part and corresponding to a value less than msb_idx_thre, such as msb_idx_p1 and thre_minus_msb_idx, can be binarized by a truncated unary code or fixed-length code. One or more bins of the resulting bin strings can be coded in the CABAC mode. For example, the CABAC mode can be used for coding the leading few bins of the prefix bin string and the bypass mode can be used for the remaining bins.

In Table 2 through Table 5, various syntax elements such as msb_idx_p1, thre_minus_msb_idx, msb_idx_p1_grT_flag, etc. have been used to illustrate exemplary syntax designs to incorporate embodiments of the present invention. Nevertheless, these particular exemplary syntax elements should not be construed as limitations to the present invention. A person skilled in the art may use similar or equivalent syntax elements to practice the present invention without departing from the spirit of the present invention.

The context selection can be conditioned on the syntax type, and the bin index. Different contexts can be assigned for coding bins from the different bin indices. In another example, some of the bins with the adjacent bin indices can share a same set of the contexts. In yet another example, all the bins with indices greater than a threshold are assigned to the same set of the contexts.

For coding a vector source, context selection can be further conditioned on the vector component index. For example, the two separate context sets can be employed for the CABAC bins from the horizontal component and the vertical components, respectively. In another example, some contexts are shared by the horizontal and vertical components. In yet another example, some contexts are shared for coding MVD and BVD.

At the encoder side, the bit cost for representing a syntax value is evaluated in the process of determining the coding parameter values. The bit cost is equal to one bit for coding a bin in the bypass mode. The estimated bit cost for coding a CABAC bin can be derived from the state of the selected context. Therefore, the estimated bit cost for representing a syntax value can be calculated by accumulating the estimated bit costs of the individual coded CABAC bins plus the number of the coded bypass bins. In this way, all syntax values coded with the same CABAC bin string and the same number of the bypass bins will have the same estimated bit cost. To speed up the estimation of the bit costs, the estimated bit costs for all CABAC bin string values can be pre-computed based on the CABAC states at the beginning of each coding unit. A look-up table (LUT) indexed by the CABAC bin string is then built to store the resulting estimated bit costs. The estimated bit cost for a syntax value can be easily found by mapping its CABAC bin string to the estimated bit cost using the LUT. For example, a system may code the bin string for the prefix part using the CABAC mode and code all the refinement bins represented in a fixed-length code using the bypass mode. In this case, the LUT maps the prefix value to the estimated bit cost.

The first method of the present invention as disclosed above is developed as a universal coding tool, which is useful for entropy coding different syntax types corresponding to diverse coding statistics. It is particularly beneficial for sources with large alphabet size such as symbols generated in screen content coding with mixed video content types and numerous new syntax types resulting from new coding tools including Intra block copying, palette coding, and string matching coding.

Some examples of parameter selection are described as follows. For example, the threshold value can be equal to 6 for the horizontal component and 5 for the vertical component when the first method is applied for coding MVD. For coding BVD, the threshold value can be equal to 5 for the horizontal component and 4 for the vertical component. In another example, the threshold value can be equal to 6 for the horizontal component and 5 for the vertical component for coding MVD at quarter-pixel accuracy, and the threshold value can be equal to 4 or 5 for the horizontal component and 3 or 4 for the vertical component for coding MVD at full-pixel accuracy.

Some examples of entropy coding for related syntax elements are described as follows. For example, syntax element abs_msb_idx_p1_gr0_flag is coded in the CABAC mode and syntax elements abs_msb_idx_p1_grT_flag, thre_minus_abs_msb_idx, and abs_msb_idx_p1_minus_thre are coded in the bypass mode for coding BVD. In another example, syntax element abs_msb_idx_p1_gr0_flag and abs_msb_idx_p1_grT_flag are coded in the CABAC mode and syntax elements thre_minus_abs_msb_idx, and abs_msb_idx_p1_minus_thre are coded in the bypass mode for coding BVD. In yet another example, syntax element abs_msb_idx_p1_gr0_flag and abs_msb_idx_p1_grT_flag are coded in the CABAC mode and syntax elements thre_minus_abs_msb_idx, and abs_msb_idx_p1_minus_thre are coded in the bypass mode for coding MVD.

For coding BVD or MVD, syntax element abs_msb_idx_p1_gr0_flag and abs_msb_idx_p1_grT_flag can be coded in the CABAC mode and syntax elements thre_minus_abs_msb_idx, and abs_msb_idx_p1_minus_thre can be coded in the CABAC mode for the first leading bin and in the bypass mode for the remaining bins. In another example, syntax element abs_msb_idx_p1_gr0_flag and abs_msb_idx_p1_grT_flag are coded in the CABAC mode and syntax elements thre_minus_abs_msb_idx, and abs_msb_idx_p1_minus_thre are coded in the CABAC mode for the 2 leading bin and in the bypass mode for the remaining bins for coding BVD or MVD.

For the Offset vector, syntax element abs_msb_idx_p1_gr0_flag and abs_msb_idx_p1_grT_flag can be coded in the CABAC mode and syntax elements thre_minus_abs_msb_idx, and abs_msb_idx_p1_minus_thre can be coded in the bypass mode. In another example, syntax elements abs_msb_idx_p1_gr0_flag and abs_msb_idx_p1_grT_flag are coded in the CABAC mode and syntax elements thre_minus_abs_msb_idx, and abs_msb_idx_p1_minus_thre are coded in the CABAC mode for the bins corresponding to bin index values less than a threshold and in the bypass mode otherwise.

A method is disclosed in JCTVC-S0085 (Li, et al., Adaptive motion vector resolution for screen content, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0085) to support selecting motion vector difference and motion compensation at either the full-pixel accuracy or quarter-pixel accuracy adaptively. The adaptive selection is based on a new slice segment header flag and the method is adopted into Screen Content Coding Test Model 3.0 (SCM-3.0). An embodiment of the first method for the entropy coding can be integrated with SCM-3.0 for coding MVD at different resolution. For example, a pre-determined value of msb_idx_thre can be assigned for each supported MVD resolution level. Therefore, the embodiment can be more effectively adapted to different MVD resolution level. Details are described as follow.

In JCTVC-S0142 (Rapaka, et al., *CE*1. Results of Test 1.1, Test 2.1 and Test 3.1, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0142), a method for coding BVD and MVD is disclosed, where each MVD component is coded. According to JCTVC-S0142, a context coded flag is first coded to indicate if the current MVD component is equal to zero. When the MVD component is not zero, another flag may be coded to indicate if absolute level of the MVD component is greater than N. If MVD is greater than N, the remaining absolute level is coded using bypass Exp-Golomb codes. One flag is coded to indicate sign of the vector.

The second method is developed by modifying the first method to further improve the MVD and BVD coding disclosed in JCTVC-S0142. For example, the same codeword structure in JCTVC-S0142 can be used to support adaptive selection of an ideal value of N by signaling N in the SPS, PPS, or slice header. Furthermore, different values of N for different MVD resolution levels can be supported. In another embodiment, different values of N for the two MVD components can be used. The compression efficiency can be improved by coding a plurality of bins for representing the Exp-Golomb prefix part in the CABAC mode.

The third method is developed to exploit the potential strong correlation between the two components of a source vector. The third method can be useful for coding the motion vector difference in motion-compensated inter-frame prediction, the block vector difference in Intra block copy as disclosed in JCTVC-S1005, and the offset vector related to the position of the reference string in Intra string copy as disclosed in JCTVC-S1103.

According to the third method, the absolute value of a vector component val[c] is represented by vector variables gr0Flag[c] and absValMinus_1[c] according to:

$$|val[c]|=gr0Flag[c]+absValMinus\_1[c]. \qquad (3)$$

The value of binary variable gr0Flag[c] equal to 1 indicates the absolute value of the vector component val[c] is greater than 0. Parameter absValMinus_1[c] represents the absolute value of val[c] minus 1. Parameter c represents the vector component, where c is equal to 0 or 1 corresponding to the x or y component respectively.

In one embodiment of the third method, entropy coding is applied to the information related to one component conditioned on the coded information related to the other component. For example, in one embodiment, syntax for gr0Flag[0] can be coded first and syntax for gr0Flag[1] can be coded using the selected context model determined by the coded gr0Flag[0].

Table 6 illustrates an exemplary syntax design to support the above embodiment. The two syntax flags, abs_msb_idx_p1_gr0_flag[0] and abs_msb_idx_p1_gr0_flag[1], where abs_msb_idx_p1_gr0_flag[0] is first coded. Syntax abs_msb_idx_p1_gr0_flag[1] is then conditionally coded depending on abs_msb_idx_p1_gr0_flag[0]. Syntax elements abs_msb_idx_p1_gr0_flag[1] and abs_msb_idx_p1_gr0_flag[0] are located immediately next to each other in order to make the conditional coding easier.

In another embodiment, information related to the two vector components is coded jointly. For example, a syntax element gr0_flag_xy can be used to indicate the values of the (gr0Flag[0], gr0Flag[1]). The syntax gr0_flag_xy can be binarized using a truncated unary code with the maximum value equal to 3 and the resulting bin string is coded in the CABAC mode with context selection determined by the bin index.

TABLE 6

| | Note |
|---|---|
| signed_vector_msb_index_coding( syntaxType) { | |
|     abs_msb_idx_p1_gr0_flag[0] | |
|     abs_msb_idx_p1_gr0_flag[1] | |

TABLE 6-continued

Note

```
        if ( abs_msb_idx_p1_gr0_flag[0] == 0 )
            abs_msb_idx_p1[0] = 0
        else {
            abs_msb_idx_p1_grT_flag[0]
            if ( abs_msb_idx_p1_grT_flag[0] == 0 ) {
                thre_minus_abs_msb_idx[0]
                abs_msb_idx_p1[0] = abs_msb_idx_thre[0] - 1 - thre_minus_abs_msb_idx[0]
            } else {
                    abs_msb_idx_p1_minus_thre[0]
                    abs_msb_idx_p1[0] = abs_msb_idx_p1_minus_thre[0] + abs_msb_idx_thre[0]
            }
        }
        if ( abs_msb_idx_p1_gr0_flag[1] == 0 )
            abs_msb_idx_p1[1] = 0
        else {
            abs_msb_idx_p1_grT_flag[1]
            if (abs_msb_idx_p1_grT_flag[1] == 0 ) {
                thre_minus_abs_msb_idx[1]
                abs_msb_idx_p1[1] = abs_msb_idx_thre[1] - 1 - thre_minus_abs_msb_idx[1]
            } else {
                    abs_msb_idx_p1_minus_thre[1]
                    abs_msb_idx_p1[1] = abs_msb_idx_p1_minus_thre[1] + abs_msb_idx_thre[1]
            }
        }
        if(abs_msb_idx_p1 [0] > 0 ) {
                if(abs_msb_idx_p1 [0 ] > 1)
                        abs_refinement_bits [0]
                sign_flag [ 0]
        }
        if( abs_msb_idx_p1 [1] > 0 ) {
                if( abs_msb_idx_p1 [1 ] > 1 )
                        abs_refinement_bits [1]
                sign_flag [ 1]
        }
}
```

The fourth method of entropy coding is developed for the offset vector related to the starting position of the reference string relative to the current string in Intra string copying. According to the Intra string copy method described in JCTVC-S1103 and JCTVC-R0098 (Li, et al., "*SCCE*4: Result of Test 3.1", Joint Collaborative Team on Video Coding (JCT-VC) of ITU-T SG 16 WP 3 and ISO/IEC JTC 1/SC 29/WG 11, 18th Meeting: Sapporo, JP, 30 June—9 Jul. 2014, Document: JCTVC-R0098), the pixel values of the current pixel string are reconstructed by copying the reference pixel string from the coded picture region. The matched string length and the offset vector of the starting position of the matched string relative to the starting position of the current string are signaled in the bitstream. Since the starting position of the reference string should come from the coded picture region, the offset vector cannot have both component values equal to or less than 0. The coordinate system in JCTVC-R0098 is used, where the positive sign refers to the position to the left in the horizontal direction and to the top in the vertical direction relative to the starting position of the current string.

In the one embodiment, the un-used codeword for representing vector (0, 0) is removed for entropy coding the offset vector of the reference string. In another embodiment, the vector components are coded separately. If the first coded component value is equal to 0, then the absolute value of the second component is inferred to be greater than 0. In yet another embodiment, the vector (gr0Flag[0], gr0Flag[1]) is jointly coded by coding syntax element gr0_flag_xy, as defined in the third method with three codeword values corresponding to (gr0Flag[0]=1, gr0Flag[1]=0), (gr0Flag[0]=0, gr0Flag[1]=1), and (gr0Flag[0]=1, gr0Flag[1]=1), respectively. In yet another embodiment, syntax gr0_flag_xy is binarized by the truncated unary code with the maximum value equal to 2 and the resulting bin string is entropy coded in the CABAC mode. The two contexts are employed and the context selection is determined by the bin index. The syntax values of 0, 1, and 2 for gr0_flag_xy correspond to (gr0Flag[0]=1, gr0Flag[1]=0), (gr0Flag[0]=0, gr0Flag[1]=1), and (gr0Flag[0]=1, gr0Flag[1]=1), respectively.

In another embodiment, the sign flags of the offset vector components (sign[0], sign[1]) are coded. According to this embodiment, information about the vector (gr0Flag[0], gr0Flag[1]) is signaled before sign coding. The signs of the two offset vector components are coded only if (gr0Flag[0]==1 && gr0Flag[1]==1). Otherwise, the signs are inferred to be positive. The fourth method further excludes the un-used codeword for representing (sign[0]=1, sign[1]=1), where sign[c] equal to 1 corresponding to the minus sign. In yet another embodiment, the syntax element offset_sign_xy is used for coding the sign flags (sign[0], sign[1]). The syntax offset_sign_xy is binarized using a truncated unary code with the maximum value equal to 2 and the resulting bin string is coded in either the CABAC mode or the bypass mode. In the CABAC mode, the two contexts are employed and the context selection is determined by the bin index. For example, the syntax values of 0, 1, and 2 for offset_sign_xy correspond to (sign[0]=0, sign[1]=1), (sign[0]=1, sign[1]=0), and (sign[0]=0, sign[1]=0), respectively.

Figure 3:
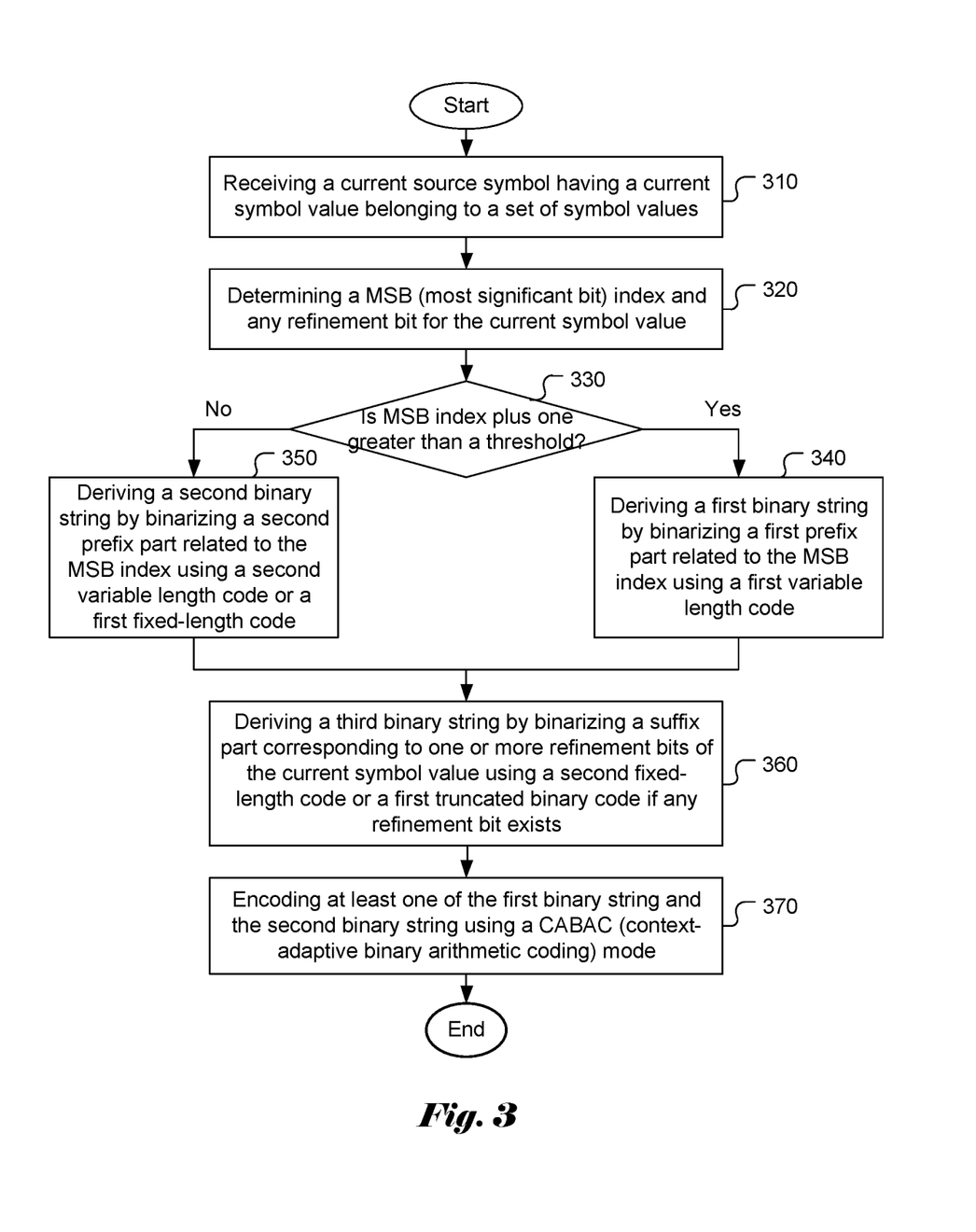
FIG. 3 illustrates an exemplary flowchart for entropy coding of source symbols with a large alphabet size according to an embodiment of the present invention.

FIG. 3 illustrates an exemplary flowchart for entropy coding of source symbols with a large alphabet size according to an embodiment of the present invention. A current source symbol having a current symbol value belonging to a set of symbol values is received in step 310. A MSB (most significant bit) index and any refinement bit for the current symbol value are determined in step 320. The MSB index plus one is tested in step 330 to determine whether it is greater than or equal to a threshold. If the result is "Yes", step 340 is performed and if the result is "No", step 350 is performed. In step 340, a first binary string is derived by binarizing a first prefix part related to the MSB index using a first variable length code. In step 350, a second binary string is derived by binarizing a second prefix part related to the MSB index using a second variable length code or a first fixed-length code. A third binary string is derived by binarizing a suffix part corresponding to one or more refinement bits of the current symbol value using a second fixed-length code or a first truncated binary code if any refinement bit exists in step 360. Then, at least one of the first binary string and the second binary string using a CABAC (context-adaptive binary arithmetic coding) mode is encoded in step 370.

The flowcharts shown above are intended to illustrate examples of entropy coding for source symbols with a large alphabet size incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of entropy coding for source symbols in an encoder comprising:
   receiving a current source symbol belonging to a set of source symbols, wherein each source symbol consists of a horizontal component and a vertical component, and the horizontal component and the vertical component are associated with one motion vector difference (MVD) for Inter prediction coding, or one block vector difference (BVD) for Intra block copy (IBC), Intra line copy, or one vector offset for Intra string copy (ISC) coding, or one position vector for the last significant coefficient in a transform unit (TU);
   determining a first flag indicating whether a first absolute value of a first component is greater than zero, wherein the first component corresponds to the horizontal component or the vertical component;
   determining a second flag indicating whether a second absolute value of a second component is greater than zero, wherein the second component corresponds to the horizontal component or the vertical component and is a different component from the first component; and
   encoding the second flag using context model derived based on the first flag after the first flag is coded, or encoding a pair of the first flag and the second flag jointly,
   wherein when the horizontal component and the vertical component are associated with one offset vector Intra string copy (ISC) coding, and the pair of the first flag and the second flag is encoded jointly, a combination for both the first flag and the second flag being zero is excluded from encoding process and the pair of the first flag and the second flag is binarized into a bin string using a truncated unary code with a maximum value equal to 2.

2. The method of claim 1, wherein when the pair of the first flag and the second flag is encoded jointly, the pair of the first flag and the second flag is binarized into a bin string using a truncated unary code with a maximum value equal to 3.

3. The method of claim 2, wherein the bin string is coded in a CABAC (context-adaptive binary arithmetic coding) mode with context selection determined by a bin index.

4. A method of entropy decoding for source symbols in an decoder comprising:
   receiving an input coded bitstream including compressed data for a current source symbol belonging to a set of source symbols, wherein each source symbol consists of a horizontal component and a vertical component, and the horizontal component and the vertical component are associated with one motion vector difference (MVD) for Inter prediction coding, or one block vector difference (BVD) for Intra block copy (IBC), Intra line copy or one vector offset for Intra string copy (ISC) coding, or one position vector for the last significant coefficient in a TU;
   decoding a second flag using context model derived based on a first flag after the first flag is decoded, or decoding a pair of the first flag and the second flag jointly, wherein the first flag indicating whether a first absolute value of a first component is greater than zero and the second flag indicating whether a second absolute value of a second component is greater than zero, and wherein the first component corresponds to the horizontal component or the vertical component and the second component corresponds to the horizontal component or the vertical component and is a different component from the first component; and recovering the horizontal component and the vertical component using decoded information including the first flag and the second flag, wherein when the horizontal component and the vertical component are associated with one offset vector Intra string copy (ISC) coding, and the pair of the first flag and the second flag is decoded jointly, a combination for both the first flag and the second flag being zero is excluded from decoding process and the pair of the first flag and the second flag is binarized into a bin string using a truncated unary code with a maximum value equal to 2.

5. The method of claim 4, wherein when the pair of the first flag and the second flag is decoded jointly, the pair of the first flag and the second flag is binarized into a bin string using a truncated unary code with a maximum value equal to 3.

6. The method of claim 5, wherein the bin string is coded in a CABAC (context-adaptive binary arithmetic coding) mode with context selection determined by a bin index.

* * * * *